US012163342B2

(12) United States Patent
Reymann

(10) Patent No.: US 12,163,342 B2
(45) Date of Patent: Dec. 10, 2024

(54) FORMWORK CORE FOR A FORMWORK SYSTEM FOR CASTING A BELL-SHAPED BODY

(71) Applicant: RATEC MASCHINENENTWICKLUNGS- UND VERWALTUNGS-GMBH, Hockenheim (DE)

(72) Inventor: Andreas Reymann, Hockenheim (DE)

(73) Assignee: RATEC MASCHINENENTWICKLUNGS-UND VERWALTUNGS-GMBH, Hockenheim (DE)

( * ) Notice: Subject to any disclaimer, the term of this patent is extended or adjusted under 35 U.S.C. 154(b) by 1036 days.

(21) Appl. No.: 17/052,659

(22) PCT Filed: Apr. 12, 2019

(86) PCT No.: PCT/EP2019/059453

§ 371 (c)(1),
(2) Date: Nov. 3, 2020

(87) PCT Pub. No.: WO2019/223936

PCT Pub. Date: Nov. 28, 2019

(65) Prior Publication Data

US 2021/0238870 A1 Aug. 5, 2021

(30) Foreign Application Priority Data

May 24, 2018 (EP) .................................... 18173984

(51) Int. Cl.
*E04G 11/02* (2006.01)
*B28B 7/22* (2006.01)
(Continued)

(52) U.S. Cl.
CPC ................ *E04G 11/02* (2013.01); *B28B 7/22* (2013.01); *B28B 7/30* (2013.01); *E04G 11/082* (2013.01)

(58) Field of Classification Search
CPC ........... B28B 7/22; E04G 11/02; E04G 11/08; E04G 11/082
See application file for complete search history.

(56) References Cited

U.S. PATENT DOCUMENTS 4,570,896 A * 2/1986 Strickland ............... E04G 11/02 249/27
4,650,150 A * 3/1987 Pacheco-Pifano .... E04G 11/082 249/19
(Continued)

FOREIGN PATENT DOCUMENTS

| | | | | |
|---|---|---|---|---|
| DE | 2 046 903 A1 | 3/1972 | | |
| DE | 25 04 218 A1 | 8/1976 | | |
| DE | 2812974 A1 * | 10/1979 | ............. | E04G 11/02 |
| DE | 40 04 654 C1 | 5/1991 | | |
| DE | 10 2009 055 690 A1 | 5/2011 | | |
| EP | 1 923 185 B1 | 8/2014 | | |
| GB | 1584749 A * | 2/1981 | ............... | B28B 7/22 |

OTHER PUBLICATIONS

Jul. 3, 2019 Search Report issued in International Patent Application No. PCT/EP2019/059453.

*Primary Examiner* — Seyed Masoud Malekzadeh
*Assistant Examiner* — Vipul Malik
(74) *Attorney, Agent, or Firm* — Oliff PLC

(57) ABSTRACT

A formwork core for a formwork system for concreting a bell body including a base frame and two corner supports detachably fastened at a variable distance. The corner supports each bear two corner connection panels, which are arranged at a right angle to each other around the corner and can be synchronously retracted and extended without touching each other. The corner supports also bear corner angle pieces, which likewise can be retracted and extended and, in the completely extended state, close the gap between the two associated corner connection panels in order to form a
(Continued)

vertical outer shell of the formwork core. The vertical edges of the corner connection panels, which vertical edges are distant from the corner, have screw flanges facing inward. Optionally, at least one side formwork panel can be inserted between the corner connection panels one side.

2 Claims, 9 Drawing Sheets

(51) Int. Cl.

| | |
|---|---|
| ***B28B 7/30*** | (2006.01) |
| ***E04G 11/08*** | (2006.01) |

(56) References Cited

U.S. PATENT DOCUMENTS

| | | | | |
|---|---|---|---|---|
| 5,524,861 | A * | 6/1996 | Solomon | E04G 11/02 249/161 |
| 5,755,982 | A * | 5/1998 | Strickland | B28B 7/22 249/161 |
| 2006/0260238 | A1 * | 11/2006 | Barcons | E04G 11/20 52/414 |
| 2015/0083889 | A1 * | 3/2015 | Floreani | B28B 7/22 249/155 |

* cited by examiner

FORMWORK CORE FOR A FORMWORK SYSTEM FOR CASTING A BELL-SHAPED BODY

The present invention relates to a formwork core for a formwork system for casting a bell-shaped body, in particular larger prefabricated units of residential buildings.

Such a formwork system essentially consists of an outer formwork and the formwork core, which is generally cuboid in shape and is inserted into the outer formwork. The outer formwork has a fixed formwork floor as well as vertical longitudinal walls and end walls that stand on a formwork floor. The formwork core sits between the formwork walls of the outer formwork. Liquid concrete is pressed into the remaining space between outer formwork and formwork core. After the concrete has hardened, the outer formwork elements are removed. In order to detach the formwork core from the inner walls of the fully cast bell-shaped body, the side formwork elements of the formwork core have to be drawn inwards to be detached from the finished concrete part.

Formwork cores with inwardly retractable side formwork elements, so-called shrink cores, are known from the prior art.

European patent EP 2 083 977 B1 of the applicant describes a formwork system for casting room modules, comprising outer formwork and formwork core. The formwork core comprises a cover element, end elements and side elements as well as a coupling mechanism. The end elements and side elements are each coupled to the base and the cover element and are movably connected. The coupling mechanism is designed in such a manner that vertical movement of a horizontal element causes the vertical elements to move inwards in such a manner that the distance between the opposite vertical elements is reduced. The coupling mechanism comprises a plurality of pivoted levers.

DE 20 469 03 A1 describes a method for producing a bell-shaped body for larger prefabricated units as well as a device for carrying out the method. One embodiment of the device comprises a stationary formwork core with columns and retractable side formworks. The side formworks are rotatably suspended from the columns via several control arms. The mechanics of pivoting cause the side formworks to fold back so that wedge-shaped gaps are created between the walls of the finished concrete body and the formwork elements.

Another older patent of the applicant, EP 1 923 185 B1, describes a displacer which is designed as a shrinking body and can be pulled upwards out of a side formwork after casting.

DE 25 04 218 A1 describes a formwork core for room cell formworks, which can be used as an inner form for producing a garage or a similar body. The formwork core has a variable cross-section. There is play between several of the pressure beams so that the cross-section can be reduced to remove the formwork.

DE 40 04 654 C1 discloses a formwork core for producing prefabricated gar-ages or similar room cells made of concrete. The formwork core can be adjusted in its width. The width can be adjusted by arranging formwork parts on slides that can be moved on rails. DE 28 12 974 A1 discloses a formwork core for a formwork system for casting a bell-shaped body according to the preamble of claim 1.

While the outer formwork consists of comparatively simple, in principle flat formwork walls, a formwork core with side formwork elements that can be retracted inwards is constructed in a quite complicated and technically complex way. The total costs for a formwork system for casting a bell-shaped body are therefore primarily determined by the costs for the complicated inner formwork core.

The outer formwork elements required for casting a prismatic bell-shaped body are in principle designed as flat formwork panels. Therefore, the outer formwork parts can be used again and again, even if a bell-shaped body with different dimensions, in particular a larger or smaller width and/or length is to be produced. It is sufficient to simply re-assemble the flat formwork walls.

A shrink core, on the other hand, can only ever be used for a specific room cell with predetermined fixed dimensions in three dimensions. Due to the complex construction and the complicated adjustment mechanism, such a shrink core is difficult to dismantle into its individual parts in order to reuse them to produce a new formwork core with different dimensions. As a result, conventional shrink cores are usually only used when a larger number of identical bell-shaped bodies are to be cast, since the relatively high cost of the formwork core can then be apportioned to the number of concrete parts produced.

Against this background, it is an object of the present invention to provide a formwork core with inwardly retractable side formwork elements which can be changed quickly and easily in such a manner that it can be used to produce bell-shaped bodies of different dimensions, in particular different widths and lengths.

In solving this problem, the starting point is a formwork core according to the preamble of the first claim, comprising a base, vertical corner supports and side formwork elements which are suspended on the corner supports via pivoted levers in such a manner that the side formwork elements can be retracted inwards.

The object is achieved by the features of the characterizing part of the first claim.

In the formwork core according to the invention, two corner supports each are releasably attached in variable distance to a common base frame. The corner supports each carry two corner connection panels, which are arranged perpendicular to each other and are synchronously retractable and extendable without touching. The corner connection panels have a flat outer wall that is designed as a formwork wall. In the fully extended state, there remains a narrow vertical gap between the two corner connection panels in the area of the corner. The corner supports also each carry a corner bracket, which can be retracted and extended synchronously with the corner connection panels. In the fully extended state, this corner bracket closes the gap between the two corresponding corner connection panels, thereby forming a vertical outer edge of the formwork core.

According to the invention, the vertical edges of the corner connection panels remote from the corner are designed such that they can be releasably attached to one another. This makes it possible that the corner connection panels lying in one plane, for instance those that form a side surface of the formwork core, can be connected directly to one another. The resulting formwork core then has a minimal length and/or width. If required, one or possibly also several intermediate elements can be releasably inserted between the corner connection panels of one side. In this way, the width and/or length of the formwork core can be increased in a very simple manner if a larger bell-shaped body is to be cast. If necessary, the formwork core according to the invention can also be restored to its original dimensions by directly connecting again the vertical edges of the corner connection panels that face each other.

The formwork core designed according to the invention thus has the great advantage that it can be easily adapted to different dimensions of a bell-shaped body to be cast, without changing those elements which are structurally complex and thus particularly expensive to manufacture. In particular, the corner supports, the corner connection panels movably mounted on the corner supports, and the corner brackets can thus be used again and again, even if the hollow bodies to be cast have very different dimensions. The same applies to the complex coupling mechanism for driving the shrink core.

According to the invention, the corners of the formwork core are formed by two, in principle flat, corner connection panels which are arranged perpendicular to one another around the corner, and a corner bracket which closes the gap between the adjacent corner connection panels and forms the vertical outer edge of the formwork core. This construction has the advantage that the length of the corner connection panels can be easily varied. It is thus possible to implement wider and shorter and/or narrower and longer formwork cores very simply just by using shorter or longer corner connection panels. The corner supports with their elaborate lever mechanisms and the coupled corner brackets can be used without modification in any case.

In order to quickly and easily, but at the same time firmly, connect and later release the vertical edges of the corner connection panels facing away from the corner, the corner connection panels comprise inward-facing bolt flanges at their free edges. By means of these bolt flanges, the corner connection panels of one side can either directly be releasably connected to one another or, alternatively, one or more extension parts can be attached.

The corner brackets are preferably coupled to the corner connection panels in such a manner that when the formwork core is drawn in, that is to say when the formwork core shrinks, the corner brackets move inwards before the corner connection panels do. The corner brackets are thus moved out of the way before the corresponding corner connection panels are drawn inwards.

The formwork core according to the invention is advantageously supplemented by a central ceiling formwork panel which is mounted horizontally on the corner supports, wherein the corner connection panels and the corresponding corner angles are coupled to the corner supports in such a manner that when the formwork core is drawn in, the corner connection panels and corresponding corner brackets move inwards and at the same time upwards above the stationary ceiling formwork panel. The length and width of such a ceiling formwork panel can no longer be changed subsequently; however, since this formwork element is in principle a simple flat plate, the replacement of the ceiling formwork panel, if necessary, is of little cost in the context of the reuse of the other, much more complex parts of the formwork core for casting a bell-shaped body with different dimensions.

Advantageously, the corner connection panels and the corner brackets have ceiling webs at their upper edges, which ceiling webs are attached at right angles to the inside. In the fully extended state of the formwork core, these ceiling webs form the top side of the formwork core together with the central ceiling formwork panel. When shrinkage begins, the horizontal ceiling webs separate from the ceiling formwork panel and move upwards and then away inwards.

According to the invention, the distance between two corner supports can be varied in that these corner supports are releasably attached to a common base frame. This makes it possible to easily adjust either the width or the length of the formwork core. An embodiment is preferred in which the base frames comprise a plurality of parallel fastening grooves in which fastening means engage, which are arranged at the foot of the corner supports. This allows the two corner supports, which are attached to this base frame, to be steplessly moved in order to vary the distance between the corner supports. Particularly preferable is an embodiment in which the base frames comprise a number of T-beams arranged in parallel and at a distance from one another.

Two adjacent T-beams each form a fastening groove for fastening the corner supports.

Optionally, at least one side formwork panel each can be releasably inserted between two corner connection panels that form a side surface of the formwork core. As a result, the length and/or width of the formwork core can be increased in a simple manner if the corner connection panels themselves are not long enough and shall not be replaced by corner connection panels of a greater length. In principle, the corner connection panels can be made very narrow, that is, they can be very short in the horizontal direction; the length and/or the width of the formwork core is then essentially determined by the dimensions of the intermediate elements.

Advantageously, not only the corner connection panels, but also the optionally insertable side formwork panels have inward-facing bolt flanges at their vertical edges, which bolt flanges correspond with the bolt flanges of the corner connection parts. This allows for a quick and releasable screw connection between corner connection panels and side formwork panels.

Hereinafter, exemplary embodiments of the invention are described in more detail with reference to the enclosed Figures, in which:

FIG. 1*a* shows a formwork system with formwork core and outer formwork, in a simplified perspective view;

FIG. 1*b* shows the formwork core of the formwork system of FIG. 1*a*, without ceiling formwork panel;

FIG. 2*a* shows a second, smaller formwork core, in a perspective view diagonally from above;

FIG. 2*b* shows the formwork core of FIG. 2*a*, without front side;

FIG. 2*c* shows the formwork core of FIG. 2*a*, without front side, rear side and ceiling formwork panel;

FIG. 2*d* shows the formwork core of FIG. 2*a*, without side formwork elements and ceiling formwork panel;

Figure 1A:
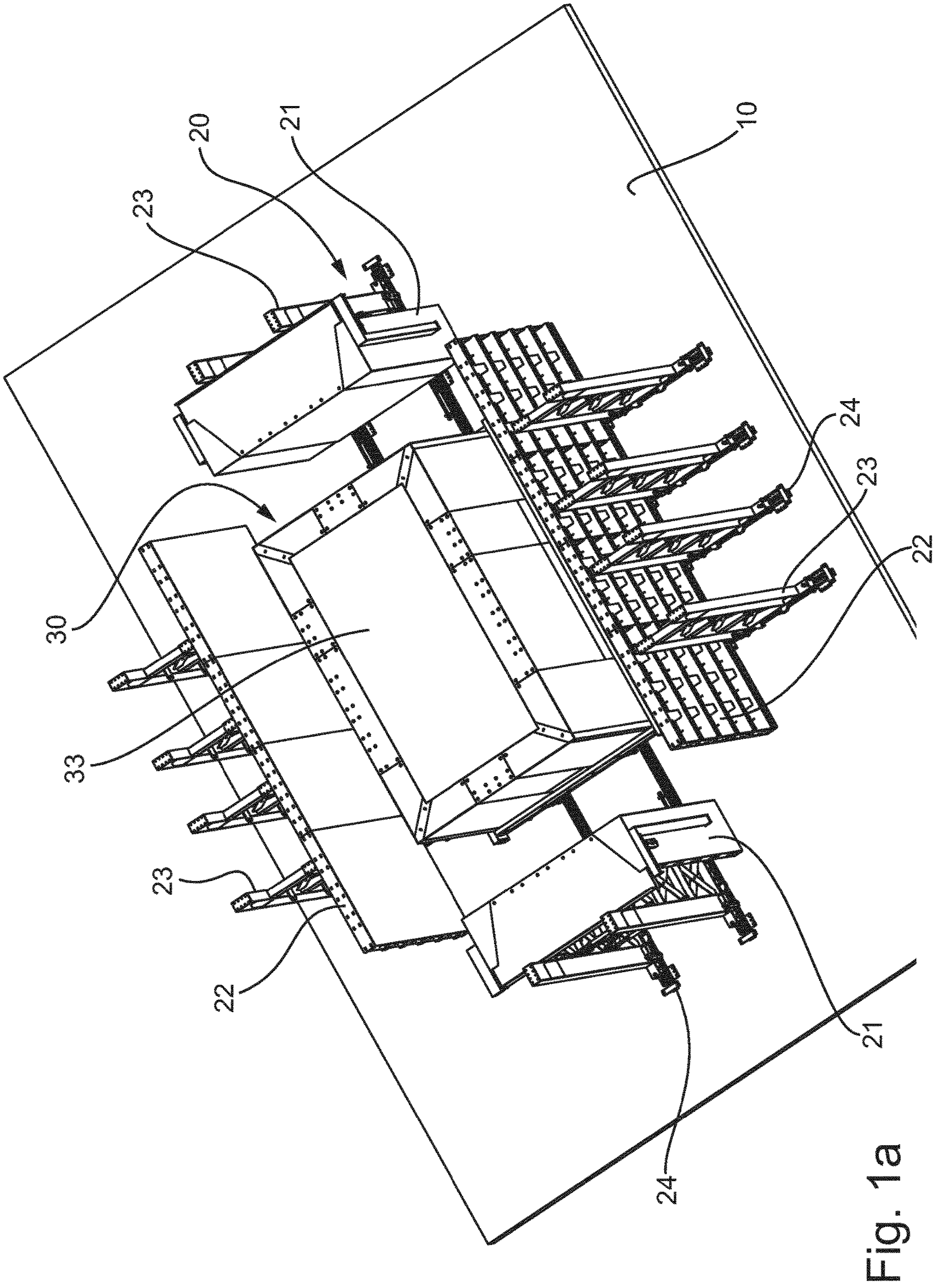

The formwork system according to FIG. 1*a* comprises a base plate 10, an outer formwork 20 and a formwork core 30 that is designed as a shrink core.

The outer formwork 20 comprises two opposite end walls 21, two side walls 22 arranged perpendicular thereto, as well as a number of vertical outer supports 23 at which the end walls 21 and the side walls 22 are suspended. The outer supports 23 are releasably attached to guide rails 24 so that all side formwork elements can be moved off outwards after casting.

The formwork core 30 sits between the outer formwork 20. The bell-shaped concrete part (not shown) can be pulled or pushed out vertically upwards after hardening, whereupon it detaches from the formwork core 30. The formwork core 30 has the shape of a rectangular cuboid, the rear side of which is open.

Figure 1B:
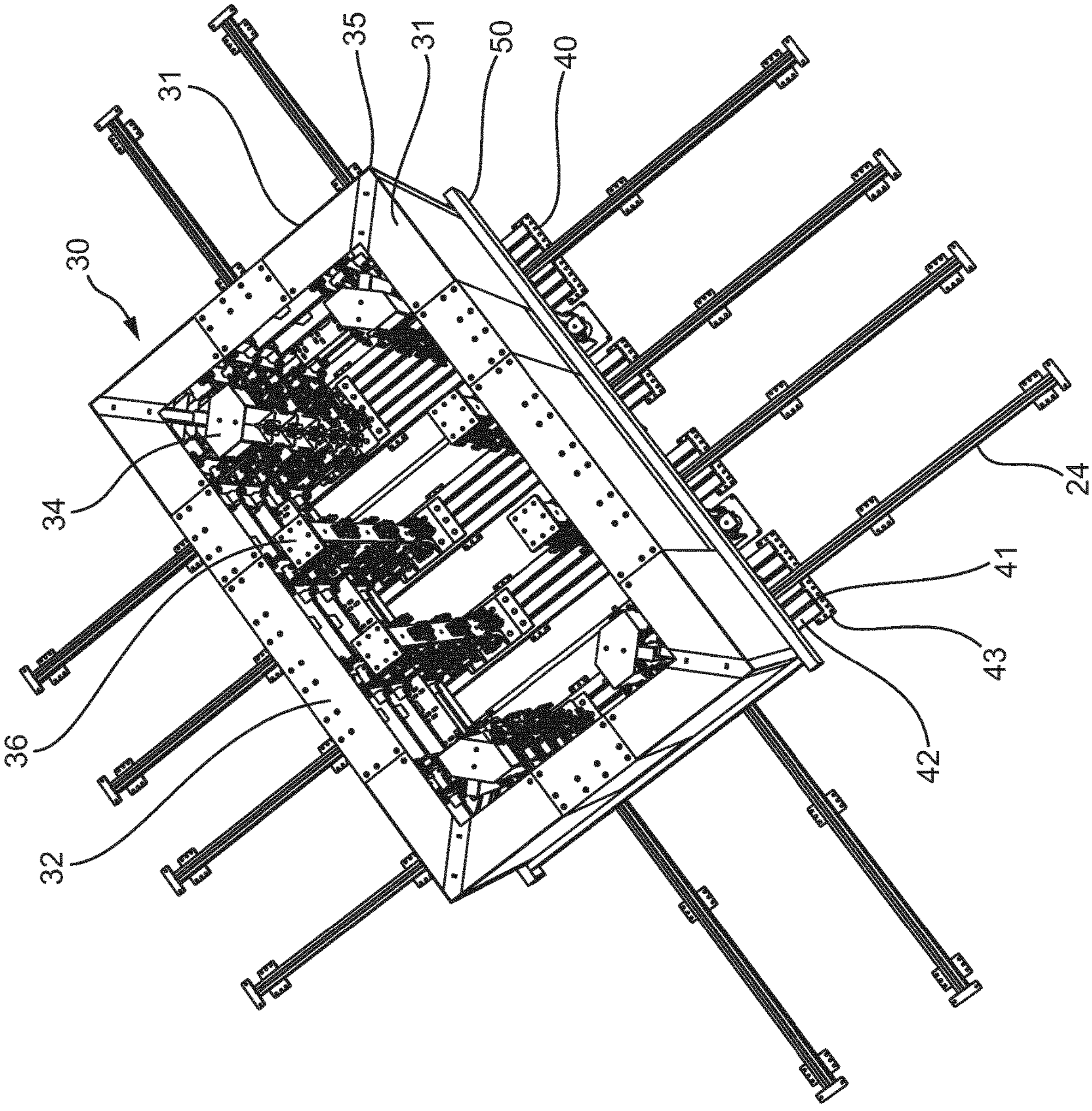

Its outer walls are formed by a total of eight corner connection panels 31, four side formwork panels 32 inserted between two corner connection panels 31, and a central horizontal ceiling formwork panel 33 (cf. FIGS. 1*a*, 1*b*).

FIG. 1*b* allows a view into the interior of the formwork core 30. Four vertical corner supports 34 can be seen, each of which carries two corner connection panels 31. Two of the total of eight corner connection panels 31 each are arranged perpendicular to one another around the corner so that they enclose one of the four corners of the formwork core 30. The corner supports 34 also each carry a corner bracket 35, which closes the gap between the two corresponding corner connection panels 31 and thus forms a vertical outer edge of the formwork core 30.

Two vertical side supports 36 each are arranged between the corner supports 34 along the two long sides of the formwork core 30. These side supports 36 carry the side formwork panels 32.

The corner supports 34 and the side supports 36 are releasably attached in pairs on a common base frame 40. The distance between the corner supports 34 and/or side supports 36 mounted on a base frame 40 is variable so that the width of the formwork core 30 can be adjusted. The base frames 40 comprise a plurality of fastening grooves 41 which are arranged parallel to one another and are open at the top. The base frames 40 comprise a plurality of T-beams 42 arranged in parallel and at a distance from one another, between which the fastening grooves 41 are arranged. The ends of the T-beams 42 are screwed onto narrow crossbeams 43 which rest on the base plate 10 (cf. FIG. 1).

The guide rails 24 for the outer supports 23 (FIG. 1*a*) protrude beyond the outer contour of the formwork core 30 so that the outer formwork 20 (FIG. 1*a*) can be moved sufficiently far outwards. Thus, the formwork core 30 becomes accessible and can be moved upwards easily after the concrete has hardened. For this purpose, a lift frame 50 engages under the lower edges of the formwork core 30. If this lift frame 50 is moved upwards after the concrete has hardened, the hardened concrete part (not shown) detaches from the outer walls of the formwork core 30; at the same time, the formwork core 30 shrinks as the corner connection panels 31, the side formwork panels 32, and the corner brackets 35 are pulled inwards in a synchronized manner. This will detach the outside of the formwork core from the concrete part. The corner brackets advance. The kinematics can be driven electrically, hydraulically or purely mechanically.

Figure 2A:
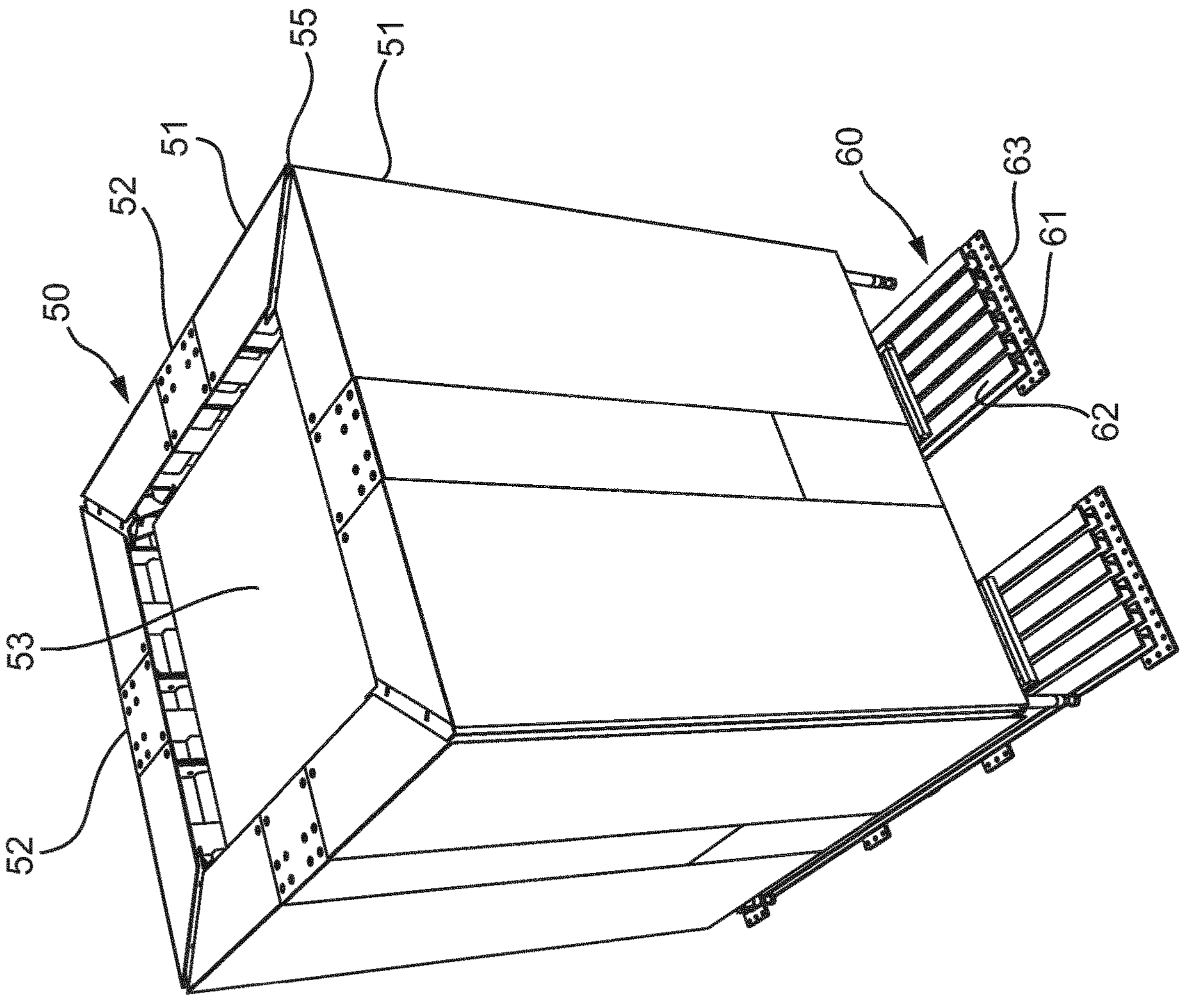

The formwork core 50 shown in FIG. 2*a* and the following Figures is somewhat smaller, in particular narrower and shorter than the previously described formwork core 30 according to FIGS. 1*a*, 1*b*. In principle, however, both formwork cores 30 and 50 are constructed identically.

The smaller formwork core 50 is also designed as a shrink core. The side formwork elements of the formwork core 50 comprise a total of eight corner connection panels 51, four side formwork panels 52 arranged between them, as well as a central, approximately square ceiling formwork panel 53. In FIG. 2*a*, the side formwork elements are raised a little upwards. An elongated corner bracket 55, which forms the vertical outer edge of the formwork core 50, fills the gap between the two corner connection panels 51 of one corner.

Figure 2B:
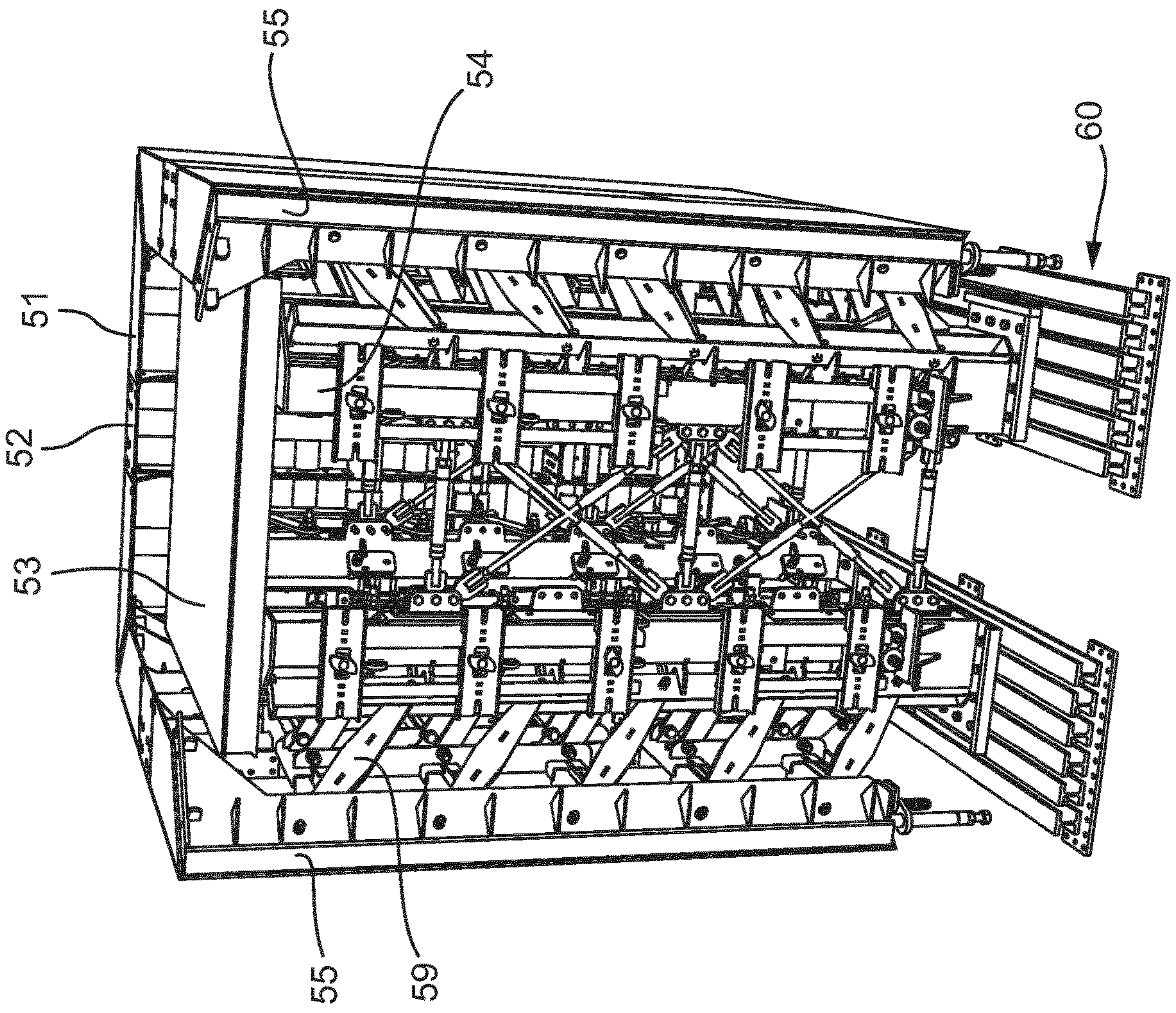
Figure 2C:
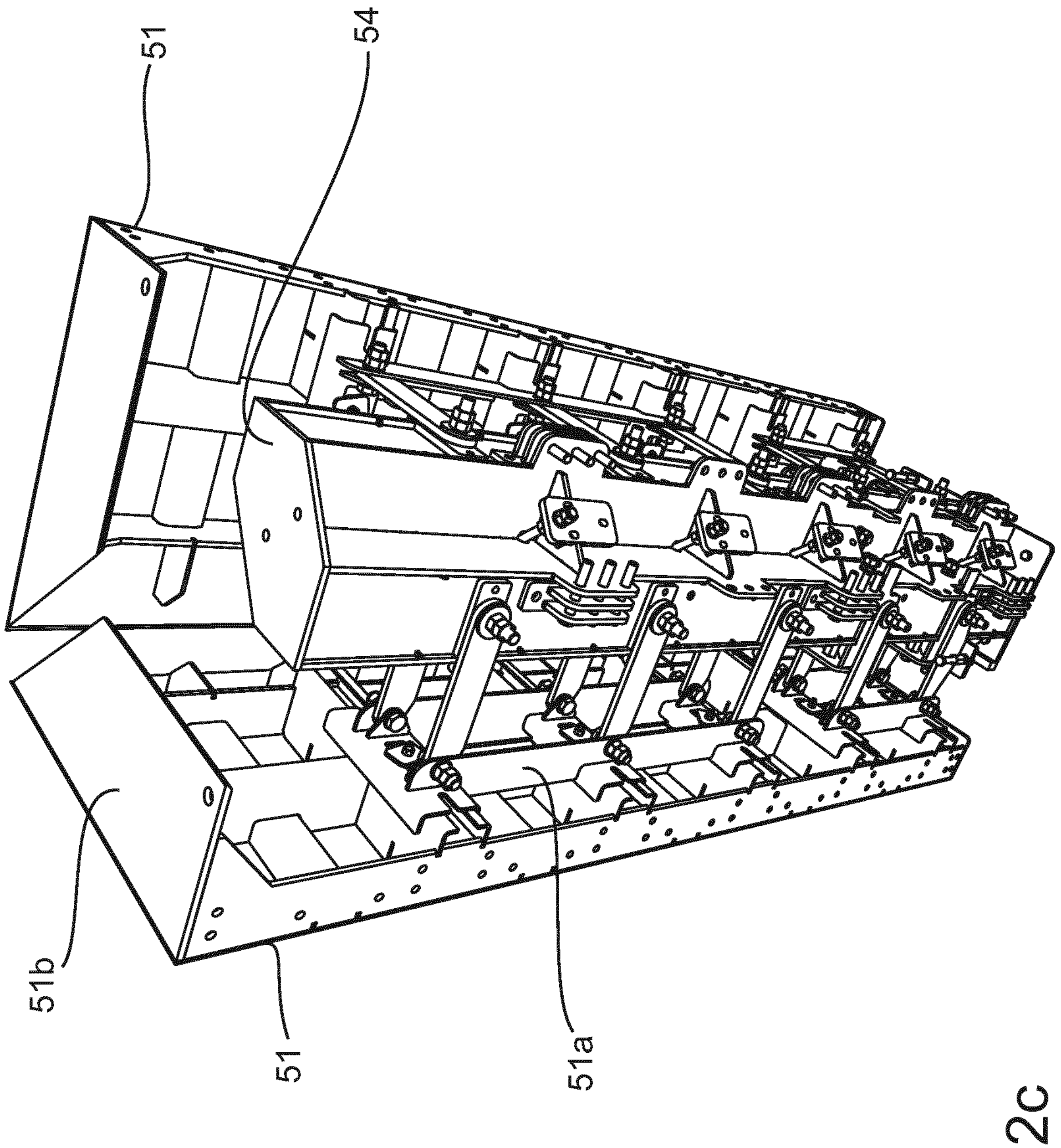
Figure 2D:
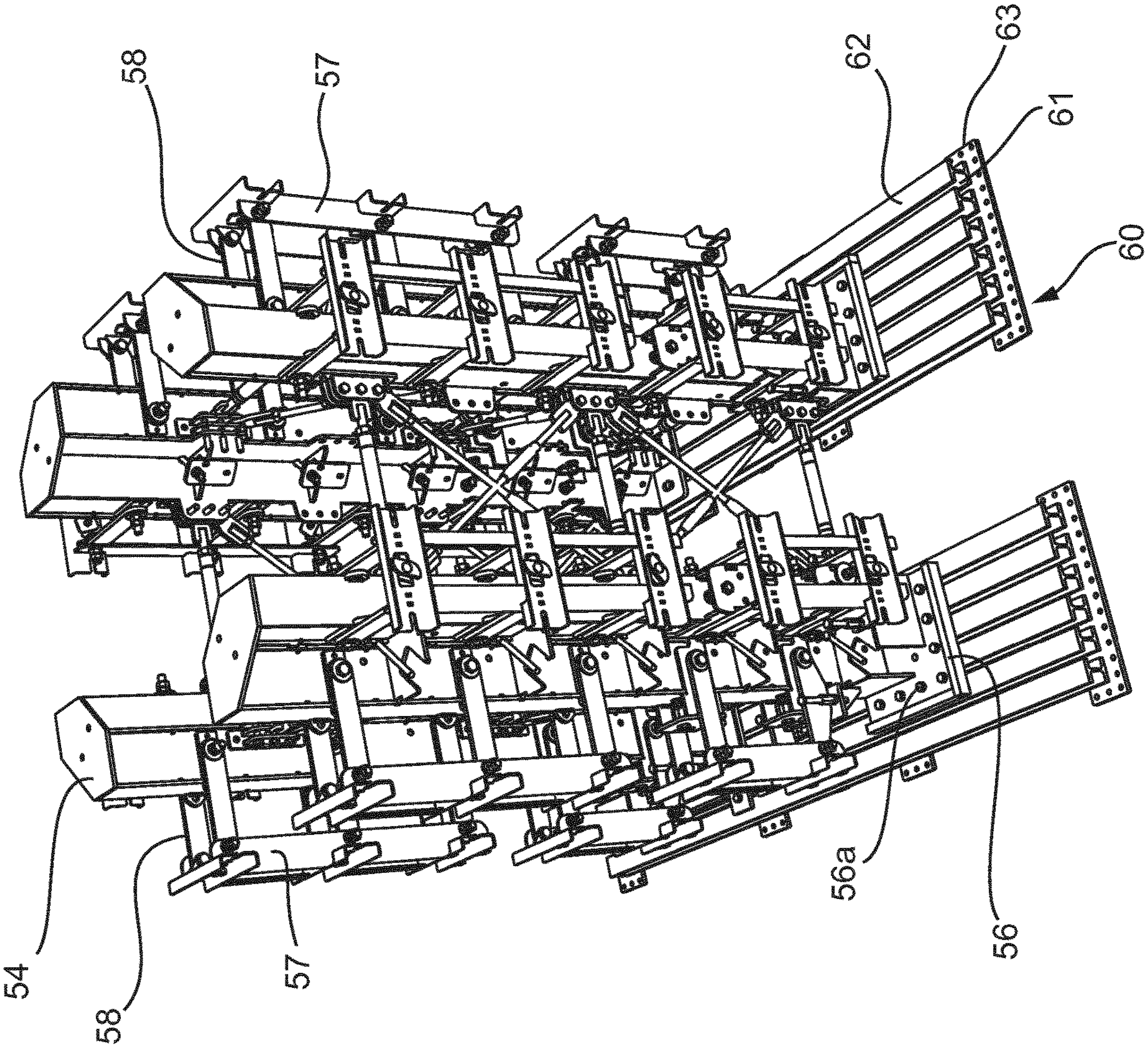

The load-bearing structure of the formwork core 50 is formed in particular by four vertical corner supports 54, as can be clearly seen from FIGS. 2*b*, 2*c*, and 2*d*. Two of these corner supports 54 each are releasably attached to a common base frame 60 (FIG. 2*a*). For this purpose, the corner supports 54 have foot plates 56 at their lower ends with fastening screws 56*a* inserted therein (FIG. 2*d*). The lower (not visible) ends of the fastening screws 56*a* engage in fastening grooves 61 of the base frames 60. The base frames 60 essentially comprise six T-beams 62, which are arranged in parallel and at a slight distance from one another, the ends of which are screwed onto crossbeams 63. The T-beams 62 form the fastening grooves 61 with a T-shaped profile. After loosening the fastening screws 56*a*, the corner supports 54 can be moved longitudinally in the fastening grooves 61 in order to increase or decrease the distance between the corner supports 54 and to thus change the length of the formwork core 50.

As can be seen in particular in FIG. 2*d*, the corner supports 54 each carry two retainers 57 which are arranged at a right angle to one another around the corner. These retainers 57 are jointedly connected with the corner supports 54 by means of pivoted levers 58. In a similar way, the corner brackets 55 are jointedly connected to the corner supports 54 via lever arms 59 (cf. FIG. 2*b*). The corner connection panels 51 are mounted on the retainers 57 (cf. FIG. 2*c*).

Figure 3:
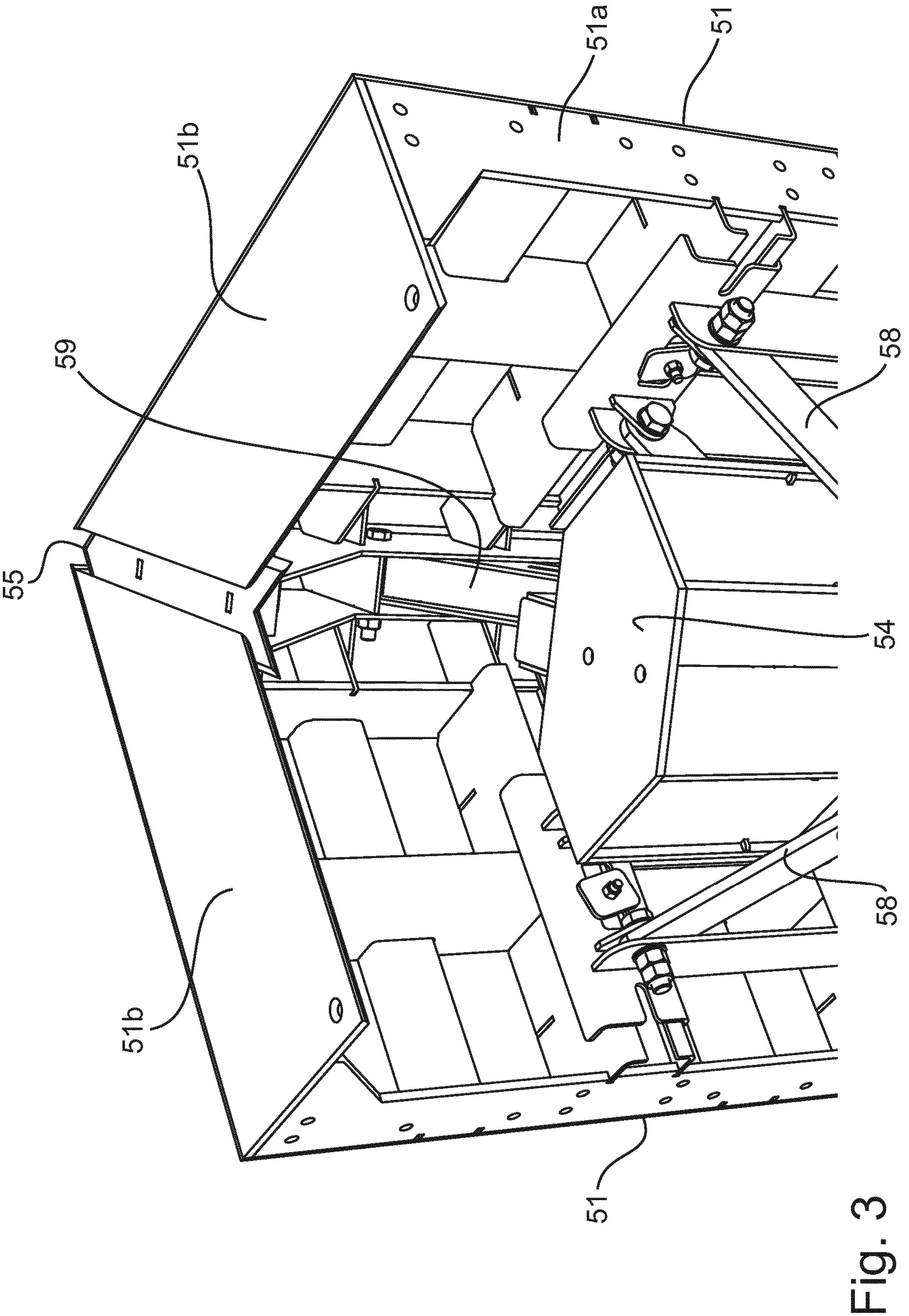
FIG. 3 shows the upper edge of the formwork core of FIG. 2*a*, viewed from the inner side and in an enlarged scale.

The enlarged illustration of FIG. 3 shows the upper end of a corner support 54. The corner support 54 has a hexagonal cross section. The pivoted levers 58 for the corner connection panels 51 and the lever arm 59 for the corner bracket 55 protrude outwards. In the illustration, the corner bracket 55 has moved inwards a little so that a gap has formed in the area of the corner between the two adjacent corner connection panels 51. When the formwork core 50 is fully extended, this gap is of course closed. The adjacent corner connection panels 51 have already moved up a little here.

Figure 4:
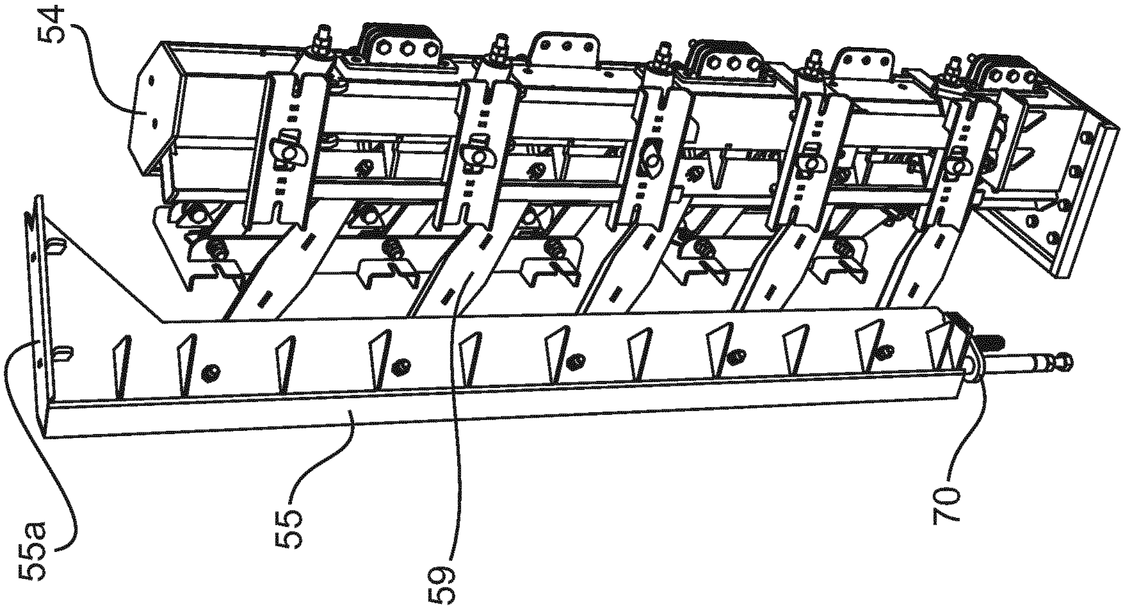
FIG. 4 shows a corner support of the formwork core of FIG. 2*a* with corner bracket.

FIG. 4 shows the cross-sectional profile of the corner brackets 55. The corner bracket 55 is essentially formed by an elongated L-profile. At the upper end, there is a ceiling web 55*a*, which is set at a right angle and points inwards.

Figure 5:
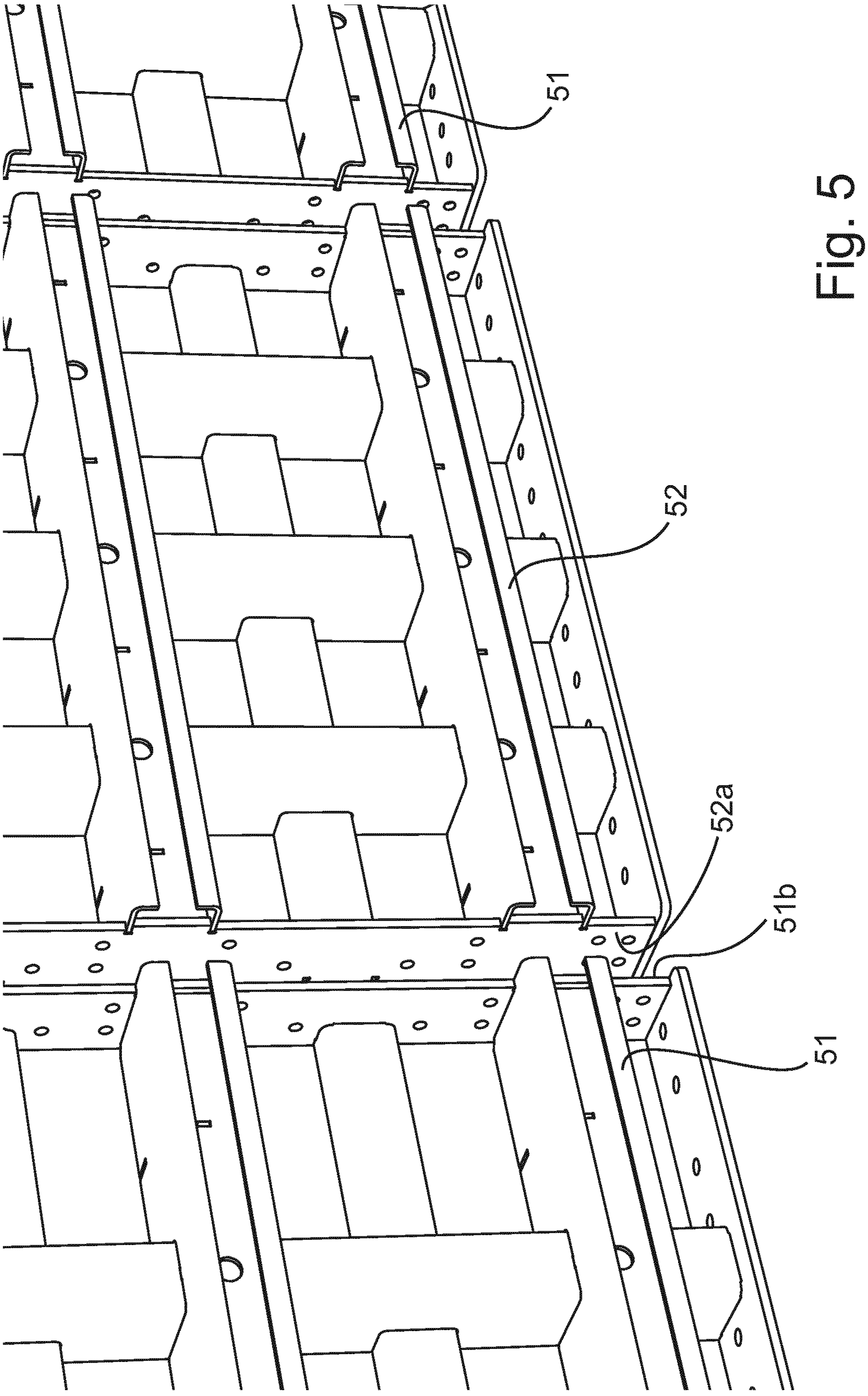
FIG. 5 shows the side formwork elements of the formwork core of FIG. 2*a*, viewed from the inner side and in an enlarged scale.

From FIG. 2*c* and in particular from the enlarged illustrations of FIGS. 3 and 5, it can be clearly seen that the corner connection panels 51 each comprise bolt flanges 51*a* at their vertical edges remote from the corner, which bolt flanges point inwards at right angles. The interposed side formwork panels 52 have corresponding bolt flanges 52*a* (cf. FIG. 5). In this way, either two corner connection panels 51, which lie in the same plane, can be screwed directly to one another, or two corner connection panels 51 can be releasably connected to a side formwork panel 52.

The corner connection panels 51 have ceiling webs 51*b* attached inwards at right angles at their upper edges (FIG. 2*c*, FIG. 3). At their upper end, the corner brackets 55 also have a perpendicular, inward-facing ceiling web 55*a*, as can be seen in particular in FIGS. 2*b* and 4. The side formwork panels 52 have ceiling webs 52*b* of the same length (cf. FIG. 2*c* and FIG. 3).

The corner brackets 55 are resiliently mounted on pressure plates 70 at their lower ends (cf. FIG. 4). As a result, the ceiling webs 55*a* of the corner brackets 55 can slide under the ceiling webs 52*b* of the adjacent corner connection panels 51 when the formwork core 50 is shrunk (cf. FIG. 3, FIG. 2*a*, FIG. 2*b*).

Horizontal and vertical tension and compression rods stiffen the construction (FIG. 2*d*).

FIG. 2*a* shows the formwork core 50 in a state in which the corner connection panels 51 are almost completely extended outwards, but the corner brackets 55 have already been pulled a little inwards or downwards. In FIG. 2*b*, the corner connection panels 51 and the corner brackets 55 have moved a little further upwards so that the path is clear to now draw in the corner connection panels 51 further inwards. In doing so, they detach from the walls (not shown) on the outside of the cast bell-shaped body.

REFERENCE NUMERALS

10 base plate
20 outer formwork
21 end wall (of 20)
22 side wall
23 outer support
24 guide rail
30 formwork core
31 corner connection panel (of 30)
32 side formwork panel
33 ceiling formwork panel
34 corner support
35 corner bracket
36 side support
37 lift frame
40 base frame
41 fastening groove (of 40)
42 T-beam
43 crossbeam
50 (small) formwork core
51 corner connection panel (of 50)
51*a* bolt flange
51*b* ceiling web
52 side formwork panel
52*a* bolt flange (of 52)
52*b* ceiling web (of 52)
53 ceiling formwork panel
54 corner support
55 corner bracket
55*a*
ceiling web (of 55)
56 foot plate
56*a* fastening screw (in 56)
57 retainer
58 pivoted lever
59 lever arm
60 base frame
61 fastening groove
62 T-beam
63 crossbeam
70 pressure plate

The invention claimed is:

1. A formwork core for a formwork system for casting a bell-shaped body, comprising:

vertical corner supports;

wherein:

the vertical corner supports each carry two corner connection panels, which are arranged perpendicular to each other around a corner and are synchronously retractable and extendable without touching, wherein, in a fully extended state, a vertical gap remains between the two corner connection panels in an area of the corner;

the vertical corner supports each carry a corner bracket, which are synchronously retractable and extendable and, in the fully extended state, close the vertical gap between the two corresponding corner connection panels to form a vertical outer edge of the formwork core;

vertical edges of the corner connection panels remote from the corner can be releasably attached to one another, or to intermediate elements between the corner connection panels;

the corner brackets are connected to the vertical corner supports by first hinged connectors; and the corner connection panels are connected to the vertical corner supports by second hinged connectors that are separate from the first hinged connectors, the first and second hinged connectors allowing upward movement of the corner brackets and the corner connection panels relative to the vertical corner supports.

2. The formwork core according to claim 1, wherein a plurality of common base frames are provided, each common base frame having two of the vertical corner supports releasably attached thereto and allowing horizontal movement of the vertical corner supports relative to each other to enable adjustment of a width of the formwork core.

* * * * *